United States Patent
Whittum

(10) Patent No.: US 11,332,229 B2
(45) Date of Patent: May 17, 2022

(54) ANTI-HARMONIC OPTICAL TURBULATORS

(71) Applicant: Goodrich Corporation, Charlotte, NC (US)

(72) Inventor: Mark Long Whittum, Newton, MA (US)

(73) Assignee: Goodrich Corporation, Charlotte, NC (US)

( * ) Notice: Subject to any disclaimer, the term of this patent is extended or adjusted under 35 U.S.C. 154(b) by 386 days.

(21) Appl. No.: 16/364,046

(22) Filed: Mar. 25, 2019

(65) Prior Publication Data

US 2020/0307757 A1 Oct. 1, 2020

(51) Int. Cl.
  *B64C 1/14* (2006.01)
  *B64C 23/00* (2006.01)
  *B64D 47/08* (2006.01)

(52) U.S. Cl.
  CPC .............. *B64C 1/14* (2013.01); *B64C 23/005* (2013.01); *B64D 47/08* (2013.01)

(58) Field of Classification Search
  CPC .................................. B64C 23/06; B64C 1/14
  See application file for complete search history.

(56) References Cited

U.S. PATENT DOCUMENTS

| 2,800,291 | A | * | 7/1957 | Veryan | ..................... B64C 23/06 244/200 |
| H324 | H | | 9/1987 | Rubin | |
| 4,703,904 | A | | 11/1987 | Haslund | |
| 4,887,779 | A | | 12/1989 | Large | |
| 5,018,683 | A | | 5/1991 | Hahn et al. | |
| 10,023,290 | B2 | | 7/2018 | Vasquez et al. | |
| 2011/0180146 | A1 | * | 7/2011 | Smith | .................. F15D 1/0035 137/1 |
| 2013/0140006 | A1 | | 6/2013 | Johnson, Sr. | |
| 2015/0251745 | A1 | | 9/2015 | Zerweckh et al. | |

FOREIGN PATENT DOCUMENTS

CA 2728011 A1 7/2012
FR 2875785 A1 3/2006

OTHER PUBLICATIONS

David Cenciotti, "What's this new camera installed on a U-2 spyplane spotted at Palmdale?", Sep. 17, 2015, Theaviationist.com, https://theaviationist.com/2015/09/17/u-2-new-camera-underneath-nose/ (Year: 2015).*
Extended European Search Report dated Jun. 4, 2020, issued during the prosecution of European Patent Application No. EP 19210963.5.

* cited by examiner

Primary Examiner — Richard R. Green
Assistant Examiner — William L Gmoser
(74) Attorney, Agent, or Firm — Locke Lord LLP; Joshua L. Jones; Scott D. Wofsy

(57) ABSTRACT

A system for controlling turbulence of fluid flowing past a window includes an imaging device compartment defining an interior and an exterior separated by a window, wherein the window encloses at least a portion of the interior, wherein the exterior includes at least one turbulator on a side upstream of the window positioned to induce turbulence over the entirety of a boundary layer of the fluid flowing past the window for even heat transfer between the fluid and the window.

15 Claims, 3 Drawing Sheets

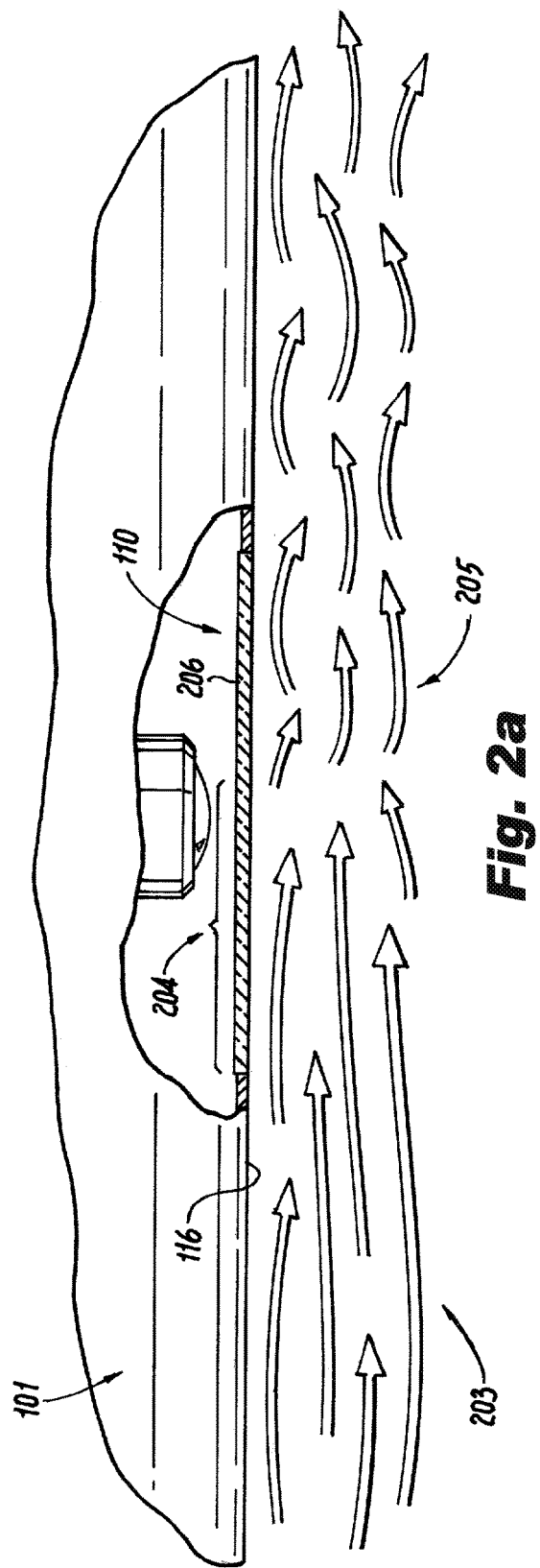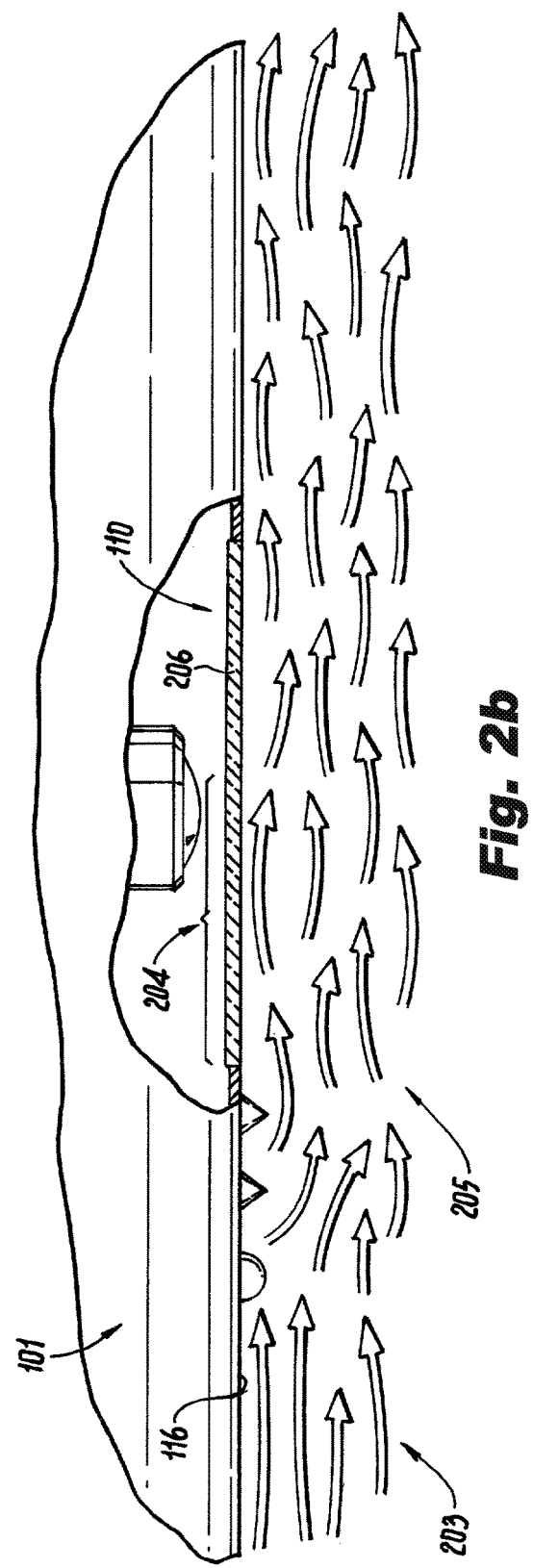

ANTI-HARMONIC OPTICAL TURBULATORS

BACKGROUND

1. Technological Field

The present disclosure relates to controlling a boundary layer past window, and more particularly to controlling a boundary layer using turbulators.

2. Description of Related Art

A variety of devices are known in the capturing images from aircraft. Minimizing of thermal gradients on airborne optical windows is critical for superior optical system performance. Transition of the local external aerodynamic boundary layer from laminar to turbulent over the window itself results in a large change in local heat transfer coefficient, resulting in a significant thermal gradient (temperature change over distance) with subsequent degradation in optical performance.

The conventional methods and systems have generally been considered satisfactory for their intended purpose. However, there is still a need in the art for optical systems having improved heat gradients. There also remains a need in the art for such systems that are economically viable. The present disclosure may provide a solution for at least one of these remaining challenges.

SUMMARY OF THE INVENTION

A system for controlling turbulence of fluid flowing past a window includes an imaging device compartment defining an interior and an exterior separated by a window, wherein the window encloses at least a portion of the interior, wherein the exterior includes at least one turbulator on a side upstream of the window positioned to induce turbulence over the entirety of a boundary layer of the fluid flowing past the window for even heat transfer between the fluid and the window. The window can include a material transparent to visible light.

The turbulator can protrudes from an exterior surface of the compartment. The turbulator can include an array of separate turbulator elements, arranged in multiple rows wherein the individual turbulators elements of each row are staggered with respect to individual turbulators elements an adjacent row in a lateral direction. Each turbulator element can include a rounded surface, and can also include at least one sharp edge, the array can include individual turbulators elements of various shapes and protrude from the surface at different heights.

The exterior surface of the compartment can be free of turbulators downstream of the window and the exterior surface of the compartment can be free of turbulators at portions lateral to the window. The window can be flush with the exterior surface of the compartment.

The compartment can be attached to a vehicle by a structural member or the compartment is a portion of a vehicle, the vehicle can be an airplane.

A method of reducing thermal gradients across the surface of a vehicle includes flying the vehicle at a velocity wherein a laminar boundary layer develops over the surface of the vehicle and over a first portion of the window and a turbulent boundary layer develops over a second portion of the window, and turbulator disturbs the boundary layer of the first portion of the window.

The turbulator can include an array of turbulators, the array includes multiple rows of individual turbulators wherein the turbulators of each row are staggered with respect to an adjacent row such that vortices generated by individual turbulators interact with vortices from adjacent turbulators. The interactions of the vortices cancel each other out.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein:

FIG. 2a is a side of FIG. 1, showing the interaction of the system with the boundary layer; and FIG. 2b is a side of FIG. 1, showing the interaction of the turbulator with the boundary layer.

DETAILED DESCRIPTION

Figure 1:
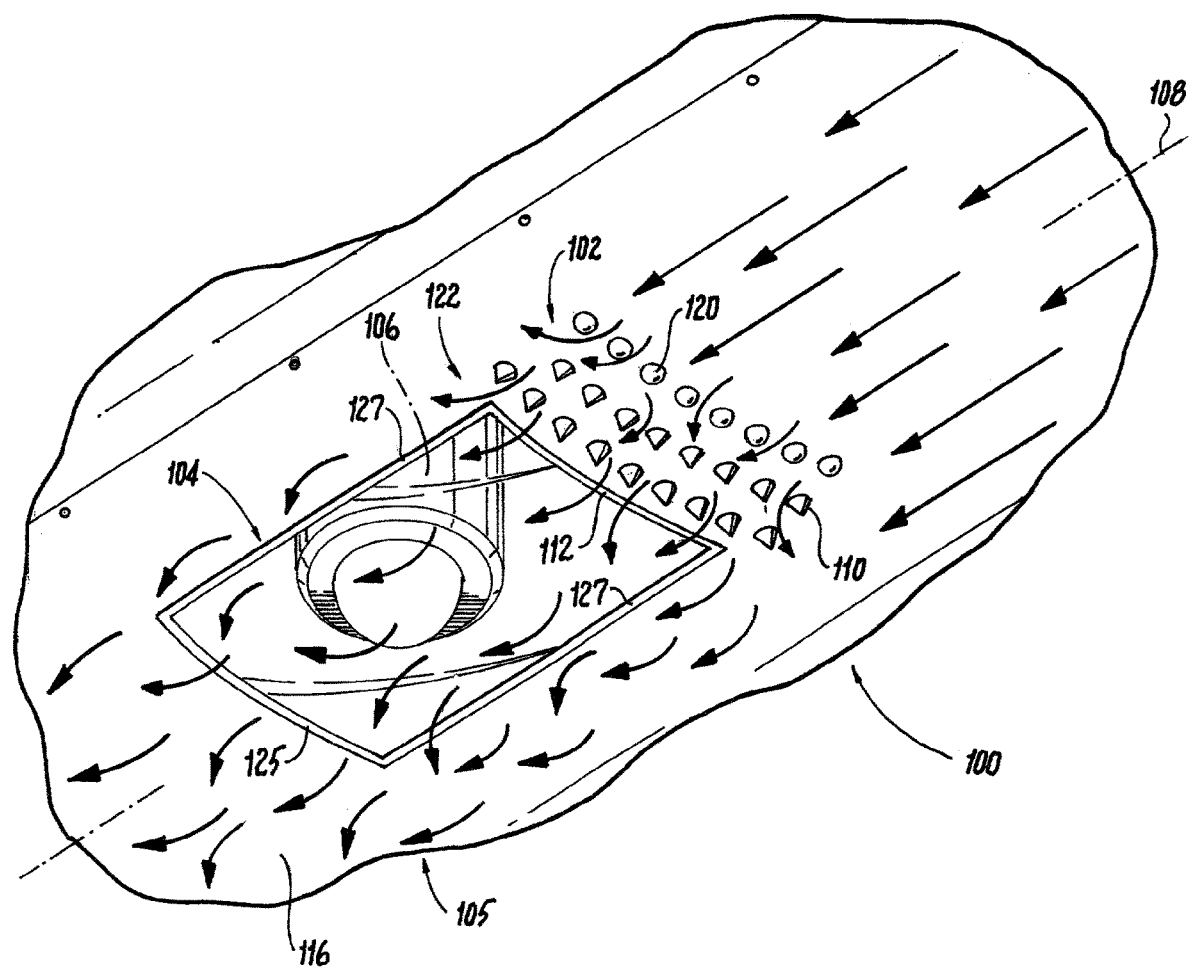
FIG. 1 is a side view of a compartment having turbulators on the outside.

Reference will now be made to the drawings wherein like reference numerals identify similar structural features or aspects of the subject invention. For purposes of explanation and illustration, and not limitation, a partial view of an exemplary embodiment of a turbulator system in accordance with the invention is shown in FIG. 1 and is designated generally by reference character 100. Other embodiments of the turbulator system in accordance with the invention, or aspects thereof, are provided in FIGS. 1a-2b, as will be described. The methods and systems of the invention can be used to control and induce turbulence of fluid flowing past a window.

Referring to FIG. 1, a system 100 for controlling turbulence of fluid 102 flowing past a window 104 includes an imaging device compartment 105 defining an interior 106 and an exterior 108 separated by the window 104, wherein the window 104 encloses at least a portion of the interior 106, wherein the exterior 108 includes at least one turbulator 110 on a side upstream 112 of the window 104 positioned to induce turbulence over the entirety of a boundary layer 114 of the fluid flowing past the window 104 for even heat transfer between the fluid and the window 104. The window 104 can include a material transparent to visible light.

The turbulator 110 protrudes from an exterior surface 116 of the compartment 105. The turbulator 110 includes an array 118 of separate turbulator elements 110, arranged in multiple rows wherein the individual turbulators elements 110 of each row are staggered with respect to individual turbulators elements 110 an adjacent row in a direction lateral to the window. Each turbulator element 110 can include a rounded surface 120, and can also include at least one sharp edge 122, the array 118 includes individual turbulators elements 110 of various shapes and protrude from the external surface 108 at different heights. The shapes also include strips located upstream of the window, having semi-cylindrical or triangular cross section. The elevation of the tabulators is such that they protrude past the laminar sublayer of the flow upstream of the window to disrupt the flow.

The exterior surface 108 of the compartment is free of turbulators downstream 125 of the window 110 and at portions lateral 127 to the window 110. The window 110 is flush with the exterior surface 108 of the compartment. The window could also protrude slightly or be slightly recessed.

Figure 1A:
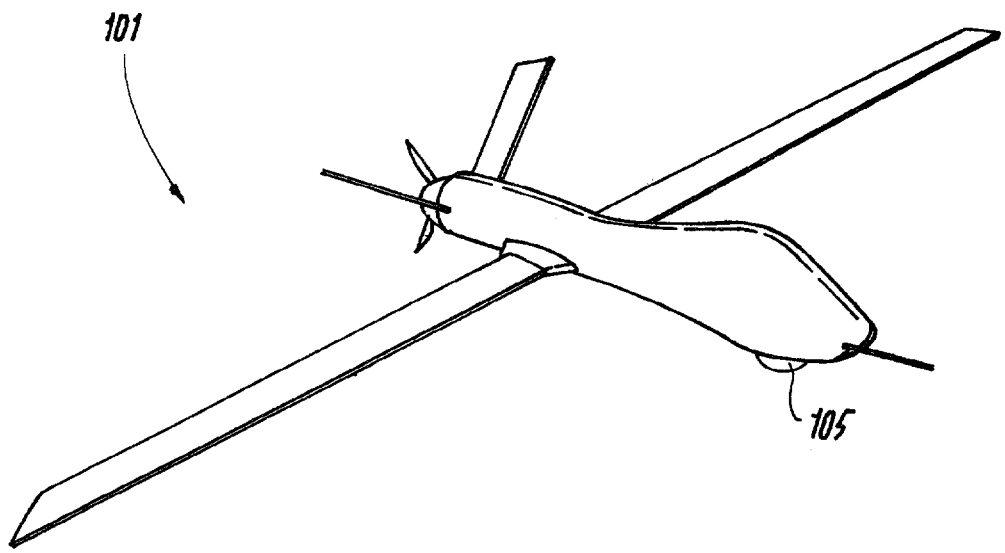
FIG. 1a is perspective view of FIG. 1, showing the compartment attached to a vehicle.
Figure 1B:
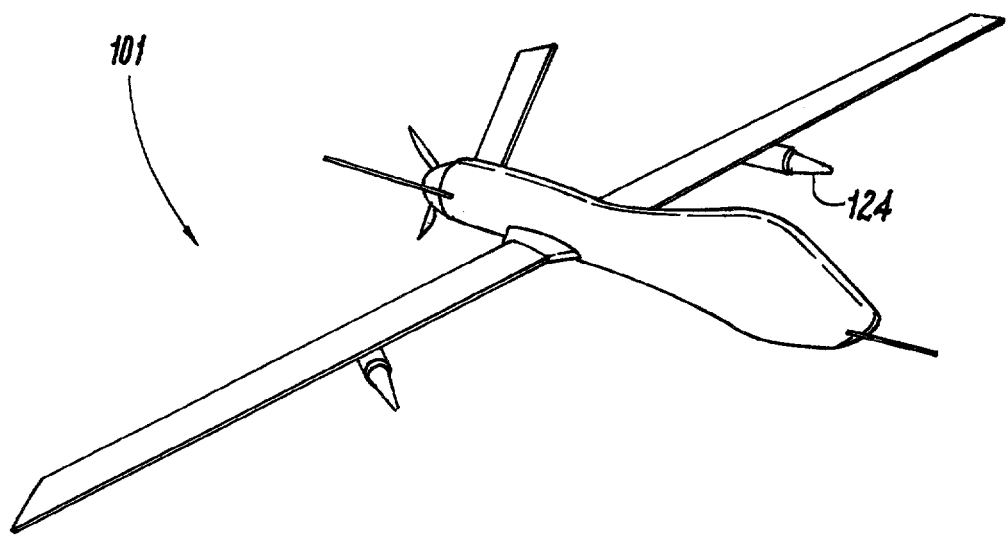
FIG. 1b is perspective view of FIG. 1, showing the compartment attached to a vehicle.

As seen in FIGS. 1*a* and 1*b*, the compartment 105 can be attached to a vehicle 101 by a structural member 124 or the compartment 105 can be a portion of a vehicle 101, such as an airplane.

A method of reducing thermal gradients 202 across the external surface 116 of a vehicle 101 includes flying the vehicle 101 at a velocity wherein a laminar boundary layer 203 develops over the surface 116 of the vehicle and over a first portion 204 of the window 110 and a turbulent boundary layer 205 develops over a second portion of the window 206, and turbulator 110 disturbs the boundary layer of the first portion 204 of the window 110.

The turbulator 110 includes an array 118 of separate turbulator elements 110, arranged in multiple rows wherein the individual turbulators elements 110 of each row are staggered with respect to individual turbulators elements 110 an adjacent row in a direction lateral to the window 110 such that vortices generated by individual turbulators 110 interact with vortices from adjacent turbulators. The interactions of the vortices cancel each other out.

The methods and systems of the present disclosure, as described above and shown in the drawings, provide for a turbulation system with superior properties. While the apparatus and methods of the subject disclosure have been showing and described with reference to embodiments, those skilled in the art will readily appreciate that changes and/or modifications may be made thereto without departing from the spirit and score of the subject disclosure.

What is claimed is:

1. A system for controlling turbulence of fluid flowing past a window comprising:
    an imaging device compartment defining an interior and an exterior separated by a downward facing window, wherein the downward facing window encloses at least a portion of the interior, and wherein the window is flush with the exterior surface of the compartment; and
    an imaging device within the interior of the compartment;
    wherein the exterior includes at least one turbulator on a side upstream of the downward facing window positioned to induce turbulence over the entirety of a boundary layer of the fluid flowing past the downward facing window for even heat transfer between the fluid and the downward facing window.

2. The system of claim 1, wherein the downward facing window includes a material transparent to visible light.

3. The system of claim 1, wherein the turbulator protrudes from an exterior surface of the compartment.

4. The system of claim 1, wherein the turbulator includes a rounded surface.

5. The system of claim 1, wherein the turbulator includes at least one sharp edge.

6. The system of claim 1, wherein the turbulator includes a semi-cylindrical or triangular cross section.

7. The system of claim 1, wherein the turbulator includes an array of separate turbulator elements.

8. The system of claim 7, wherein the array includes multiple rows of individual turbulators elements wherein the individual turbulators elements of each row are staggered with respect to individual turbulators elements an adjacent row.

9. The system of claim 7, wherein the array includes individual turbulators elements of varying shapes.

10. The system of claim 7, wherein the array includes individual turbulators elements protruding from the surface at different heights.

11. The system of claim 1, wherein the exterior surface of the compartment is free of turbulators downstream of the downward facing window.

12. The system of claim 1, wherein the exterior surface of the compartment is free of turbulators at portions lateral to the downward facing window.

13. The system of claim 1, wherein the compartment is attached to a vehicle by a structural member.

14. The system of claim 1, wherein the compartment is a portion of a vehicle.

15. The system of claim 1, wherein the vehicle is an airplane.

* * * * *